United States Patent [19]

Bosche et al.

[11] Patent Number: 5,680,686
[45] Date of Patent: Oct. 28, 1997

[54] STRUT SPRING COMPRESSOR HAVING FLOATING COMPRESSION HEAD

[75] Inventors: Kevin S. Bosche; Thomas S. Bolgrean, both of Moorhead, Minn.

[73] Assignee: Branick Industries, Inc., Fargo, N. Dak.

[21] Appl. No.: 587,918

[22] Filed: Jan. 17, 1996

[51] Int. Cl.$^6$ ..................................................... B23P 19/04
[52] U.S. Cl. .................................................. 29/227; 254/10.5
[58] Field of Search .............................. 29/215, 216, 217, 29/218, 225, 227, 258; 254/10.5; 269/272, 274, 71

[56] References Cited

U.S. PATENT DOCUMENTS

| | | | |
|---|---|---|---|
| 1,036,441 | 8/1912 | Buck | 269/71 |
| 2,646,618 | 7/1953 | Simons . | |
| 2,971,565 | 2/1961 | Jarund | 269/274 |
| 3,067,500 | 12/1962 | Bliss . | |
| 3,384,348 | 5/1968 | Wicker . | |
| 3,814,382 | 6/1974 | Castoe . | |
| 3,912,224 | 10/1975 | Castoe . | |
| 4,009,867 | 3/1977 | Diffenderfer . | |
| 4,034,960 | 7/1977 | Kloster . | |
| 4,036,473 | 7/1977 | Kloster . | |
| 4,105,188 | 8/1978 | Mendoza et al. . | |
| 4,219,918 | 9/1980 | Klann . | |
| 4,295,634 | 10/1981 | Spainhour et al. . | |
| 4,395,020 | 7/1983 | Spainhour . | |
| 4,486,935 | 12/1984 | Kashiwagi . | |
| 4,494,289 | 1/1985 | Matsuura . | |
| 4,502,664 | 3/1985 | Bendickson et al. . | |
| 4,516,303 | 5/1985 | Kloster . | |
| 4,520,543 | 6/1985 | Ito . | |
| 4,555,100 | 11/1985 | Ditto | 269/285 |
| 4,558,500 | 12/1985 | Kloster . | |
| 4,785,519 | 11/1988 | Krueger . | |
| 4,834,352 | 5/1989 | Thorton | 269/274 |
| 4,872,644 | 10/1989 | Papapetros . | |
| 4,872,645 | 10/1989 | Dossier . | |
| 5,031,294 | 7/1991 | Krueger . | |

FOREIGN PATENT DOCUMENTS

| | | | |
|---|---|---|---|
| 707643 | 4/1965 | Canada | 269/71 |
| 1089306 | 9/1960 | Germany | 269/71 |

OTHER PUBLICATIONS

Tech Bulletin TB–59, Branick Industries, Mar. 15, 1990.
Branick Brochure on MST–580A, dated before Jan. 17, 1996.
Branick Brochure entitled "The Branick MST–58A MacPherson Strut Spring Compressor . . . Designed with the Mechanic in Mind," dated before Jan. 17, 1996.
Branick "Product Update," dated before Jan. 17, 1996.

(List continued on next page.)

*Primary Examiner*—Robert C. Watson
*Assistant Examiner*—Thomas W. Lynch
*Attorney, Agent, or Firm*—Merchant, Gould, Smith, Edell, Welter & Schmidt

[57] ABSTRACT

An apparatus for use in assembling and disassembling a strut assembly of the type having a shock absorber axially disposed within a coil spring includes a frame, a first section connected to the frame for supporting the lower portion of the spring, and a second section for holding the upper portion of the spring or upper spring seat. The second section is movable toward and away from the first section and is arranged for axially compressing the spring as the second section moves toward the first section. The second section includes guide structure, a head, linkage structure, and pivot structure. The guide structure is connected to the frame and is for allowing the second section to move toward and away from the first section. The head is mounted on the guide structure and is for positioning the spring. The linkage structure is connected to the guide structure and is for allowing the head to tilt in a first plane generally parallel to the linear axis of the spring. The pivot structure connects the head to the guide structure and is for allowing the head to tilt in a second plane intersecting the first plane. The apparatus also includes urging structure for moving the second section toward the first section.

20 Claims, 6 Drawing Sheets

OTHER PUBLICATIONS

Operating Instructions entitled, "MacPherson—Strut Spring Compressor," dated before Jan. 17, 1996.

Operating Instructions entitled, "Air Operated MacPherson Strut Spring Compressor," dated before Jan. 17, 1996.

Operating Instructions entitled, "Stock #5800-1 1989 or Later Ford Thunderbird & Mercury Cougar Adapter," dated before Jan. 17, 1996.

Operating Instructions entitled, "Compressor para Resortes de Suspensiones MacPherson," dated Sep., 1992.

Operating Instructions entitled, "Model 610, Model 612 MacBridge, MacPherson Strut Spring Compressor Tools," dated before Jan. 17, 1996.

Brochure entitled, "447 P Spring Compressor," dated before Jan. 17, 1996.

Brochure entitled, "Coil Spring Compressor," dated before Jan. 17, 1996.

Brochure entitled, "Coil Spring Compressor, for MacPherson Suspensions, Save Time–Money, Work Efficiently," dated before Jan. 17, 1996.

Brochure entitled, "Quality Strut Tools," dated before Jan. 17, 1996.

Advertisements entitled, "GP Grand Performance Tool," 1981.

Operating Instructions entitled, "Mitsubishi MacPherson Strut Spring Compressor," Jun. 1, 1990.

Operating Instructions entitled, "Clamshell Strut Tool," Jun. 1, 1993.

Brochure entitled, "Chassis Clinic Tool Offer," Jan. 1993.

Brochure entitled, "Kowa Seiki Universal Strut Compressor," dated before Jan. 17, 1996.

Brochure entitled, "Mod. 89 SAS Brevettato," dated before Jan. 17, 1996.

Advertisement entitled, "Under Car Tool–Up Time," Dec., 1990.

STRUT SPRING COMPRESSOR HAVING FLOATING COMPRESSION HEAD

BACKGROUND OF THE INVENTION

1. Field of the Invention

This invention relates generally to accessory tools. More particularly, this invention relates to an apparatus for use in assembling and disassembling a strut assembly of the type having a shock absorber axially disposed within a helical, coil spring.

2. Description of the Related Art

Certain types of automotive suspension systems, such as the MacPherson-type, include a suspension subassembly. The subassembly includes a shock absorber and a spring, and is often referred to as a strut assembly. The shock absorber or damper consists of a piston within the body of the shock absorber connected to a piston rod which projects upwardly from the shock absorber in a telescoping fashion. A coil spring is mounted in a compressed state around the piston rod and body of the shock absorber between a lower spring seat integral with the body of the absorber and an upper spring seat fastened to the upper end of the piston rod of the shock absorber. Such a suspension subassembly is mounted as a unit in the vehicle body and is disassembled, serviced and reassembled separately.

Disassembly of the strut assembly is accomplished by compressing the coil spring using a suitable tool to remove pressure from the lower spring seat of the strut assembly. Having done so, the retaining means holding the piston rod to the upper spring seat can be removed. This retaining means variously takes the form of a nut or retaining ring which fastens above the upper spring seat to the piston rod retaining all components of the strut assembly. The shock absorber and lower spring seat can then be removed leaving the spring in a compressed state within the tool. If required, the spring can then be decompressed and removed. In some cases, the coil spring must be compressed by engaging the spring between the upper and lower spring seats rather than engaging the upper spring seat and spring.

New or serviced components can be reassembled following the reverse of the foregoing process. Namely, with the spring in a compressed state, the shock absorber is placed axially through the spring such that the piston rod protrudes beyond the coil spring upper end and the lower spring seat contacts the lower end of the compressed spring. The appropriate retaining means is fastened to the piston rod above the upper spring seat. The strut assembly is released from the tool and is ready for reinstallation in the vehicle.

Numerous apparatus have been developed to assist in the assembly and disassembly of a strut suspension system. Examples of these may be found in U.S. Pat. Nos. 4,558,500; 4,520,543; 4,516,303; 4,494,289; 4,785,519; and 5,031,294, to name a few. With the design and development of newer and different types of strut assemblies, it has become desireable to have an apparatus which can accept a wide variety of different types of strut assemblies and different types and sizes of MacPherson strut assemblies. It is also desireable that the apparatus is able to be quickly adapted by the user to accept a particular sized strut assembly for quick and efficient assembling and disassembling. It is also recognized to be important to ensure that the apparatus can securely engage and retain a spring to be compressed and otherwise ensure safety to an operator since the springs are compressed under a large force which, if released without control, could injure an operator.

SUMMARY OF THE INVENTION

In accordance with the purposes of the invention, as embodied and broadly described herein, the invention comprises an apparatus for compressing a coil spring assembly having a lower portion, an upper portion, and a linear axis. The apparatus includes a frame, a first section connected to the frame for supporting the lower portion of the spring, and a second section for holding the upper portion of the spring or upper spring seat and being movable toward and away from the first section. The second section is for axially compressing the spring as the second section moves toward the first section, and includes guide structure and a head. The head is mounted in a manner permitting the head to tilt in a first plane generally parallel to the linear axis of the spring assembly and to allow the head to tilt in a second plane intersecting the first plane.

The head is allowed to tilt along at least two different planes by the linkage structure and pivot structure. The linkage structure is connected to the guide structure and is for allowing the head to tilt in the first plane generally parallel to the linear axis of the spring. The pivot structure connects the head to the guide structure and allows the head to tilt in the second plane intersecting the first plane of the spring.

The guide structure is connected to the frame and allows the second section to move toward and away from the first section. The head is mounted on the guide structure and is for engaging the spring or upper spring seat. Urging structure is included for moving the second section toward and away from the first section.

Preferably, the head includes a ring supporting a plurality of hooks for holding a second end of the spring or upper spring seat. More preferably, each of the hooks are radially adjustable to and from the center of the ring and are rotatable within their supports through a limited range for accommodating various spring and upper spring seat angles. The guide structure preferably includes first and second tubes for sliding over part of the frame to allow the head to move toward and away from the first section. The linkage structure preferably includes first and second links connected to the guides, to allow the head to tilt along a first axis. The pivot structure preferably includes a pair of pivot fasteners attached to the head pivotably connecting the head to the guide structure.

Preferably, the first section includes three lower hooks radially adjustable to a common center.

The urging structure preferably includes a screw connected to the linkage structure, and a hub mounted on the screw and bearing on the frame.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention. In the drawings:

DESCRIPTION OF THE PREFERRED EMBODIMENT

Figure 1:
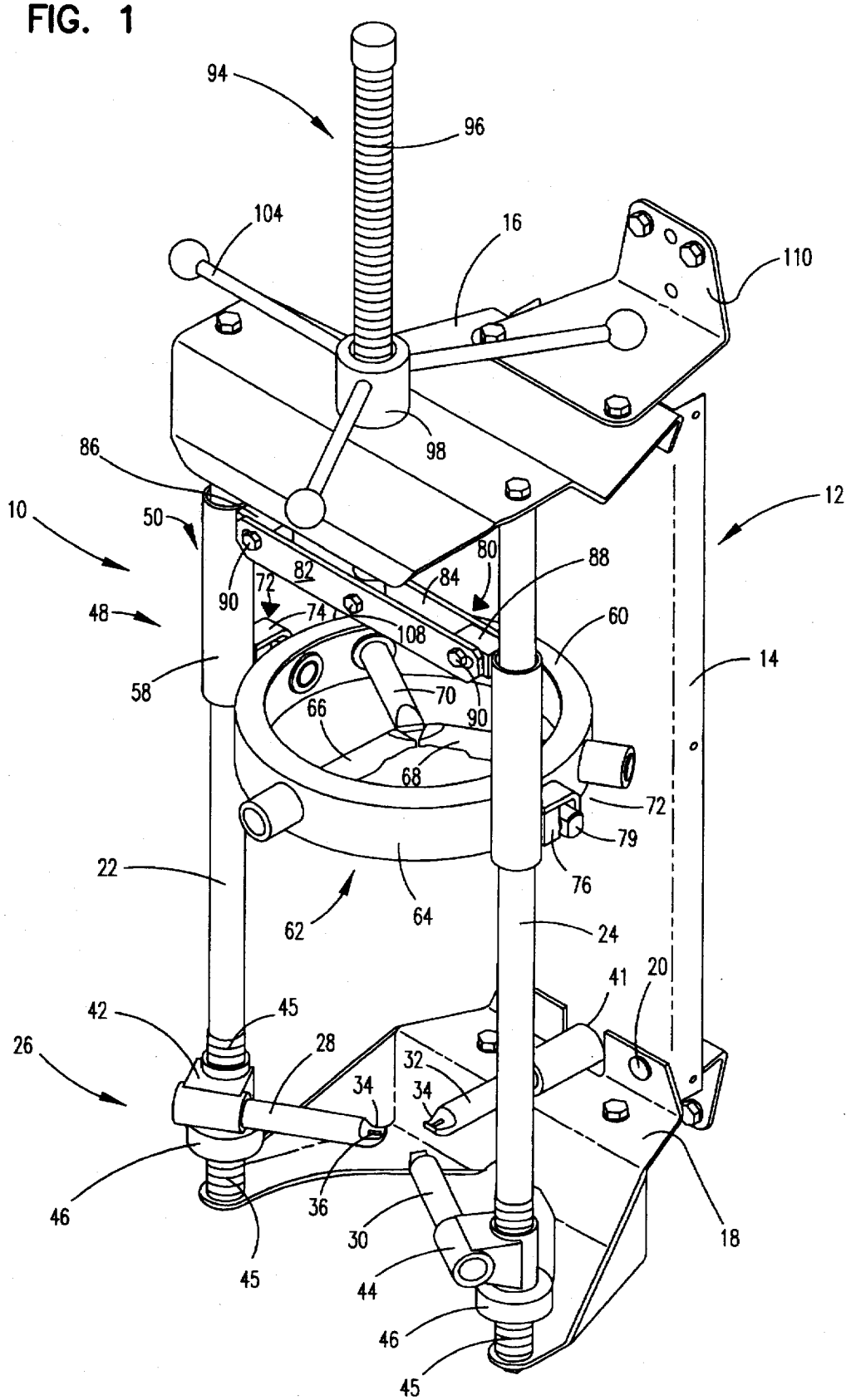
FIG. 1 is a perspective view of an embodiment of the present invention.

Reference will now be made in detail to the present preferred embodiment of the invention, an example of which is illustrated in the accompanying drawings. Whenever possible, the same reference numbers will be used throughout the drawings to refer to the same or like parts.

An apparatus for use in assembling and disassembling a strut assembly of the type having a shock absorber axially disposed within a coil spring is shown generally at 10. In accordance with the invention, the present invention includes a frame. As embodied herein, apparatus 10 defines a frame 12 having a flat vertically disposed back plate 14 which may be mounted against a work place wall (not shown) or mounted to a bench (not shown). The frame 12 includes spaced apart top and bottom plates 16, 18, respectively, each of which are rigidly bolted to back plate 14 by a plurality of bolts 20. Extending between top plate 16 and bottom plate 18 are a pair of parallel spaced vertical bars 22, 24.

In accordance with the invention, the present invention includes a first section for supporting the lower portion of a spring assembly. As embodied herein, apparatus 10 defines a first compression section 26 for supporting a preferred arrangement of members for holding the lower portion of a spring. More particularly, a preferred way of holding the lower portion of a spring includes an arrangement of lower hooks. A first lower hook 28 is fastened to first parallel bar 22. Second lower hook 30 is fastened to second parallel bar 24. Third lower hook 32 is fastened to bottom plate 18. Each of the hooks are generally elongated and include cupped recessed areas 34. These recessed areas 34 are for holding the coil of the spring of a strut assembly. Use of elements other than hooks, such as bars or plates, may also be used to engage the strut assembly.

In one preferred arrangement, the lower hooks may include means for protecting the spring assembly and for providing additional friction between the lower hooks and the spring assembly. As embodied herein, one such means includes a cushioned pad 36 in recessed areas 34. Pads 36 protect the spring coils and provide friction for preventing the spring from turning or slipping within the tool. Pads 36 are made of an adhesive backed urethane providing a high coefficient of friction and good durability. The adhesive backing allows for replacement. It is preferred that the pads 36 reside in a pocket within the recessed areas 34 that is a fraction of the thickness of the pad 36 to ensure that the pad 36 will contact the spring and also help to prevent the shearing of the pad adhesive under load. Other means for providing protection and additional friction are contemplated by the inventors. For example, sleeves or coatings may be used on the hooks either alone or in combination with the pads.

Each of the lower hooks include a preferred arrangement for allowing the lower hooks to be adjusted radially in order to meet at a common center and accommodate a wide variety of spring diameters that can be found on strut assemblies. In particular, in the preferred embodiment shown, first and second lower hooks 28, 30 are connected to first and second bars 22, 24 by way of mounting sleeves 42, 44, respectively. First and second lower hooks 28, 30 are slidable within mounting sleeves 42, 44 to be radially slidable toward and away from the central vertical axis of apparatus 10. Further, the hook adjustment need not be limited to radial, but can include any other type of adjustment. Each of the lower hooks 28, 30, 32 are rotatably seated within its respective holder. That is, each of lower hooks 28, 30, 32 are allowed to rotate a limited amount from side-to-side within its mounting block. This accommodates the wide variety of spring helixes that can be found on strut assemblies by allowing the recessed areas 34 to squarely contact the spring coil.

Figure 2:
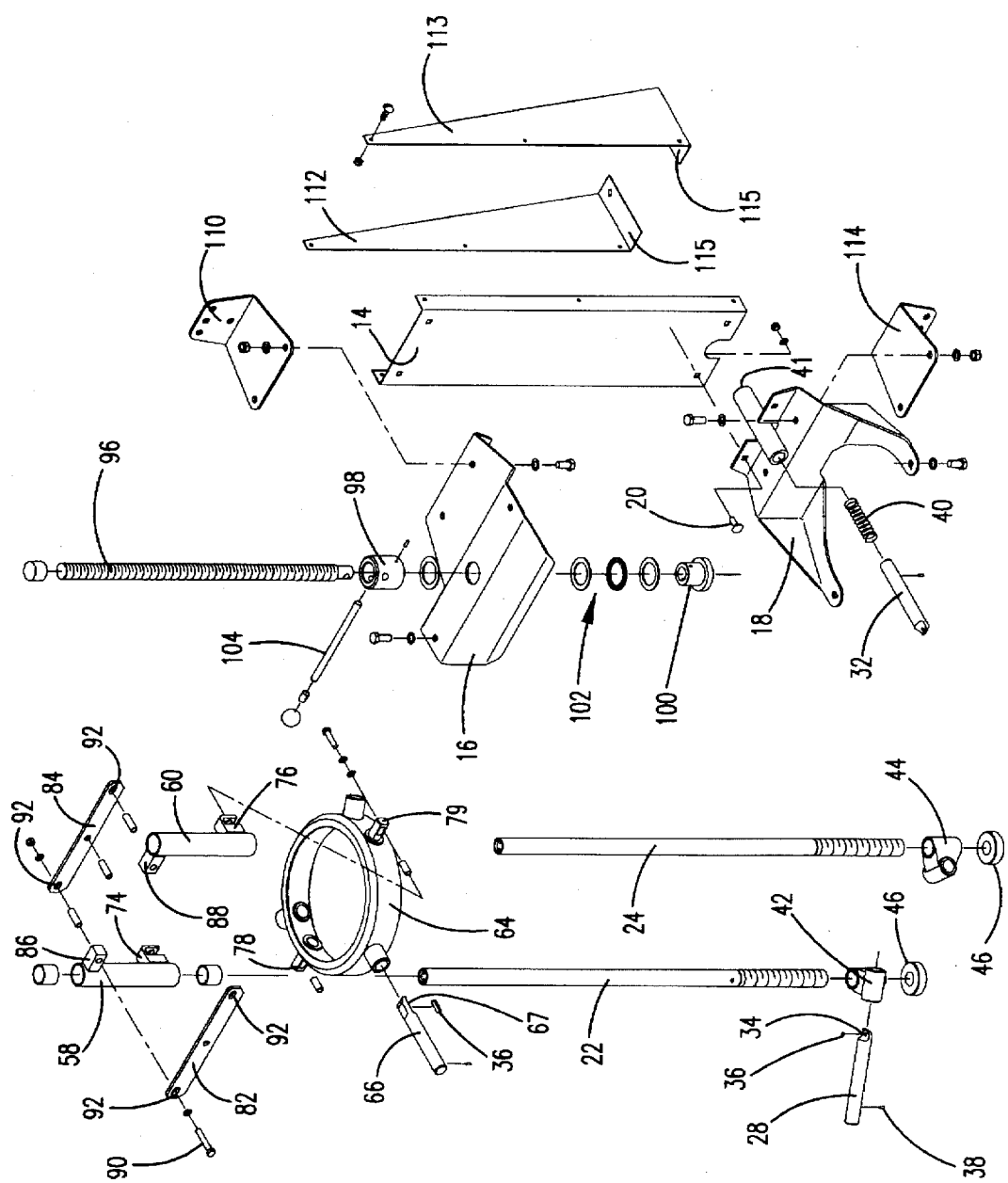
FIG. 2 is an exploded view of an embodiment according to the present invention.
Figure 3:
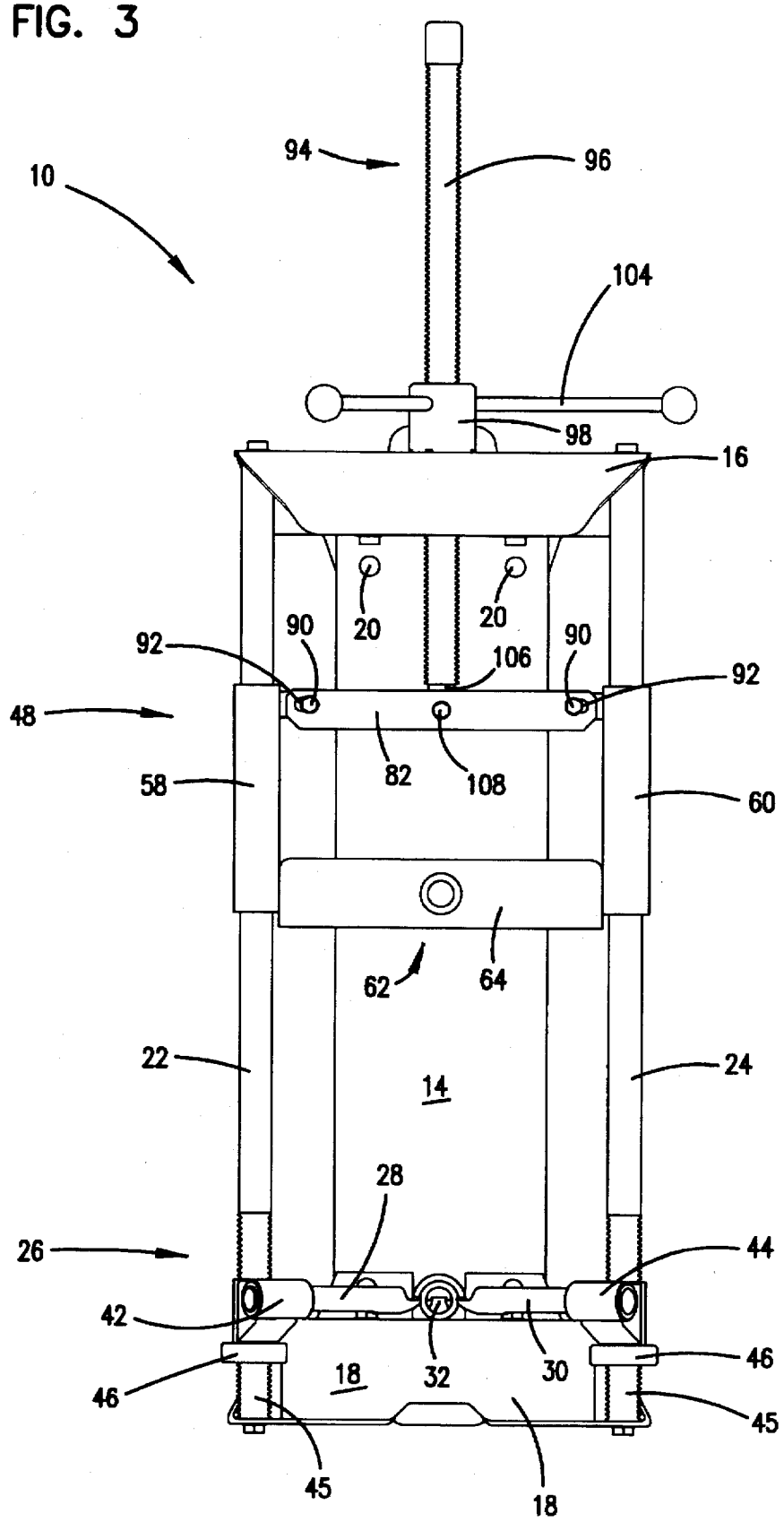
FIG. 3 is a front elevation view of the embodiment shown in FIG. 1.
Figure 4:
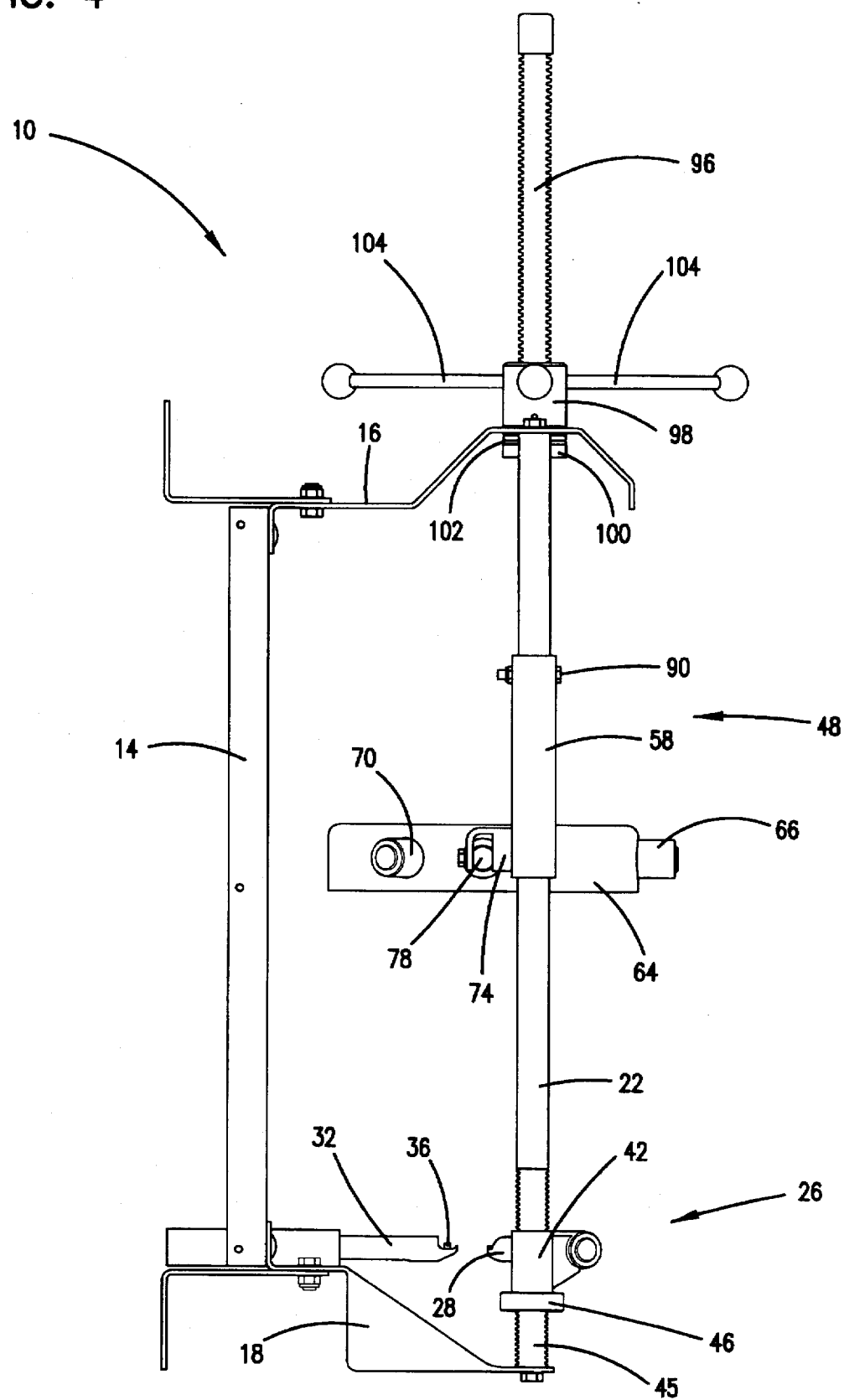
FIG. 4 is a side elevation view of the embodiment shown in FIG. 1.

In this particular arrangement, first and second mounting sleeves 42, 44 are slidably attached to first and second bars 22, 24 over threaded portions 45. Nuts 46 fit on first and second bars 22, 24 over the threaded portions 45. It is through rotation of nuts 46 which permit sleeves 42, 44 to move linearly along bars 22, 24 translating into vertical motion of first and second lower hooks 28, 30. Other types of mechanisms may be used to adjust lower hooks, such as pins, clamps, friction locks, or different screw mechanisms. The vertical motion of the first and second lower hooks 28, 30 allows for adjustment of apparatus 10 to a wide variety of strut assemblies. As illustrated in FIG. 2, a tube-shaped holder 41 holds third lower hook 32 and a spring 40. The spring 40 forces the third lower hook 32 to adjust to its fully extended position. This preferred arrangement makes mounting of the strut assembly easier and ensures that the third lower hook 32 will be engaged with the spring of the strut assembly. It is envisioned by the inventors that other ways of attaching the hooks to the frame are possible and are included in the scope of this invention. For example, third lower hook 32 may be modified to be fully adjustable.

In accordance with the invention, a second section holds an upper portion of a spring assembly, wherein the second section is moveable toward and away from the first section and allows for axially compressing the spring assembly as the second section moves towards the first section. As the term "upper portion of a spring assembly" is used herein, it means not only the coiled part of the spring, but also any part of the strut assembly including the upper spring seat (described below). As embodied herein, apparatus 10 includes a preferred second compression section 48. One such preferred second compression section 48 includes guide structure 50 arranged for allowing the second section to move toward and away from the first section 26; a head 62 mounted on the guide structure 50 for positioning the spring; linkage structure 80 connected to the guide structure 50 to allow the head 62 to tilt from side-to-side, i.e., in a first plane generally parallel to the linear axis of the spring assembly; and pivot structure 72 arranged to allow the head 62 to tilt from front-to-back, i.e., in a second plane intersecting the first plane. The combination of linkage structure 80 and pivot structure 72 allows head 62 to move from side-to-side and front-to-back, when viewing the apparatus 10 from the front in its normal, upright position. Other second compression sections are envisioned by the inventors as including structure which is adjustable and able to grasp a wide variety of strut assemblies, and compress the assemblies toward the first section, while allowing for at least two different degrees of pivot or tilting motion. Of course, compression sections allowing for more than two different degrees of tilting motion are also envisioned by the inventors.

One preferred guide structure 50 includes first and second tubes 58, 60, respectively. First and second tubes 58, 60 slidingly fit over first and second bars 22, 24. It is because of their sliding relationship with the frame, in particular first and second bars 22, 24, which permit the second compression section 48 to move toward and away from the first compression section 26.

Guide structure 50 holds a head 62 which generally functions to hold and position the upper portion of the spring or upper spring seat. The head can be a variety of shapes and sizes. In one preferred arrangement, head 62 includes a ring 64. Ring 64 is a generally circular frame with a hollow interior. Ring 64 can be replaced with any other structure that allows suitable clearance and stiffness in which to house a spring contact structure. Ring 64 supports a plurality of upper hooks. In the particular embodiment shown, ring 64 supports first, second, and third upper hooks 66, 68, 70. Each of upper hooks 66, 68, 70 are rotatably seated within ring 64. That is, each of upper hooks 66, 69, 70 are allowed to rotate a limited amount from side-to-side within ring 64. Further, each of upper hooks 66, 68, 70 are radially adjustable to and from the center of the ring 64. The versatility of the hook placement allows apparatus 10 to more easily accommodate the various types of strut assemblies. In particular, because the hooks 66, 68, 70 are adjustable radially to the center of ring 64, in combination with the tilting motion of the head, they can fit either the upper spring seat of a strut assembly or can be placed directly on the upper coils of a spring when appropriate. This allows apparatus 10 to be used not only on MacPherson style struts, but also on coil-over-shock type struts as well. This will be explained further below in particular reference to FIGS. 5–8. Elements other than hooks may also be used to engage the strut assembly. For example, bars or plates may be used. Further, the hook adjustment need not be limited to radial adjustment but may very well include other types of adjustment.

Each of upper hooks 66, 68, 70 are generally elongated and include cupped recessed areas 67. In one aspect of the invention, the upper hooks may include means for protecting the spring assembly and for providing additional friction between the upper hooks and the spring assembly. As embodied herein, one such means includes a cushioned pad 36 which resides in a pocket within the recessed area 67. Pad 36 protects the spring coils and provides friction for preventing the spring from turning or slipping within the tool. It is preferred that the recessed areas 67 be a fraction of the thickness of the pad to ensure that the pad will contact the spring and also help to prevent the shearing of the pad adhesive under load. Other means for providing protection and additional friction are contemplated by the inventors. For example, sleeves or coatings may be used on the upper hooks either instead of or in combination with the pads.

It will be appreciated by those skilled in the art that the design of head 62 with a relatively narrow width allows the first and second compression sections 26, 48 to be moved within just inches of each other. In the particular arrangement shown, the second compression section 48 is allowed to be compressed within two inches of the first compression section 26 to allow for a wide variety of strut assemblies to be serviced. This is particularly helpful in struts having a small number of coils and a high spring helix angle.

Head 62 is allowed to pivot from side to side. As embodied herein, the head includes pivot structure 72. A preferred arrangement of pivot structure 72 includes first and second pivot fasteners 74, 76. First and second pivot fasteners 74, 76 are integrally attached to first and second tubes 58, 60, respectively. First and second pivot fasteners 74, 76 fit over mating pivot members 78, 79 which are secured to ring 64. First and second pivot fasteners 74, 76 are connected to mating pivot members 78, 79 by conventional methods. This arrangement allows head 62 to tilt about the axis running through first and second pivot members 78, 79.

In accordance with the invention, the present invention includes linkage structure constructed and arranged to allow the head to tilt in a first plane generally parallel to a linear axis passing through the spring assembly. As embodied herein, apparatus 10 includes a linkage structure shown generally as 80. More particularly, in the preferred arrangement shown, the linkage structure 80 includes first and second links 82, 84. The linkage structure 80 connects first tube 58 to second tube 60. First and second links 82, 84 are generally spaced apart parallel plates. Rigidly disposed on opposing surfaces of tubes 58, 60 are mounting blocks 86, 88. First and second links 82, 84 are pivotally mounted to opposite sides of blocks 86, 88 by bolts 90 passing through aligned openings of first and second links 82, 84. Bolts 90 act as pivot pins. First and second links 82, 84 have openings 92 to accommodate bolts 90. Openings 92 are elongated slots. With first tube 58 connected to second tube 60 by way of the pivotal pin connections of linkage structure 80, first tube 58 may move on bar 22 relative to the movement of tubes 60 on bar 24.

It will be appreciated by those skilled in the art that the design of the second compression section 48 will allow the compression head 62 to self adjust to the angles of a strut assembly, which are often compound. The inventors have discovered that this is accomplished by providing for a combination of pivot structure 72 which allows for a degree of tilt in one direction, and another axis of tilt provided by link structure 80. Elongated openings 92 in the first and second links 82, 84 allow the guide structure 50 to move independently through a range thus causing the head 62 to tilt and align to the angle of the strut assembly top plate or coil.

In accordance with the invention, the present invention comprises urging structure arranged for moving the second section toward and away from the first section. As embodied herein, urging structure is generally shown at 94. In a preferred arrangement shown, the urging structure 94 includes a threaded shaft 96 which is journaled through an upper and lower hub 98, 100. Lower hub is mounted by way of a bearing 102 under the top plate 16. Accordingly, upper and lower hubs 98, 100 are freely turnable by an operator engaging handles 104 and turning hubs 98, 100. Turning of handles 104 moves shaft 96 up or down depending on the direction of turning. Threaded shaft 96 terminates at a force transmitting end 106. Shaft 96 is disposed to be parallel to and centrally disposed between first and second bars 22, 24. Force transmitting end 106 is pivotally connected to the first and second links 82, 84 by a pivot pin 108. Pivot pin 108 is lower than the openings 92 in the first and second links 82, 84 in order to make the second compression section 48 self aligning.

It is envisioned that other types of urging structure may be used. For example, hydraulics or pneumatic actuators may be used to urge the second compression section toward the first compression section.

The invention includes structure for mounting the apparatus to a wall. In the preferred arrangement shown, apparatus 10 includes first and second brackets 110, 114. First bracket 110 is bolted to top plate 16. Second bracket 114 is bolted to bottom plate 18. First and second brackets 110, 114 are then secured to a wall or post using appropriate fasteners.

Alternatively, the apparatus 10 may be mounted to a bench. For bench mounting, the particular arrangement shown includes first bench bracket 112 and second bench bracket 113. First and second bench brackets 112, 113 are secured to back plate 14 and may be mounted to a bench through holes provided in a bottom portion 115 of first and second bench brackets 112, 113 and through holes in bottom plate 18.

Use of apparatus 10 will now be described with reference to a strut assembly 116. Strut assembly 116 may be a common MacPherson-type strut assembly, or it may include one of the coil-over-shock types, to be described below. Strut assembly 116 includes a spring 118 and a shock absorber 120. Shock absorber 120 has a body portion 122 and an extending piston rod 124. Mounted on body portion 122 is a lower spring seat 126. An upper spring seat 128 is connected to a free end of piston rod 124 by means of a nut or retaining ring 130. The strut assembly 116 is commercially available and is well known. Spring 118 is retained between lower spring seat 126 and upper spring seat 128 with the spring 118 held in compression.

From time to time, it is desireable to remove a shock absorber 120 from a strut assembly 116. The present invention is ideally suited to this task. A strut assembly 116 is placed in apparatus 10. The lower section of the spring is mounted within the first compression section 26. Nuts 46 are turned along threaded portions 45 of first and second bars 22, 24 in order to adjust first and second lower hooks 28, 30 such that their recessed areas 34 engage the coil spring 118 and position the strut assembly vertically aligned with the central vertical axis of the tool. Third lower hook 32 is automatically pushed out by its spring 40 in order to engage the spring 118. An operator engages handle 104 in order to move the threaded shaft 96 downwardly and thus move the linkage structure 80, the guide structure 50, and the head 62 downwardly toward the first compression section. The head is moved downwardly until it is low enough to engage the strut assembly.

Figure 5:
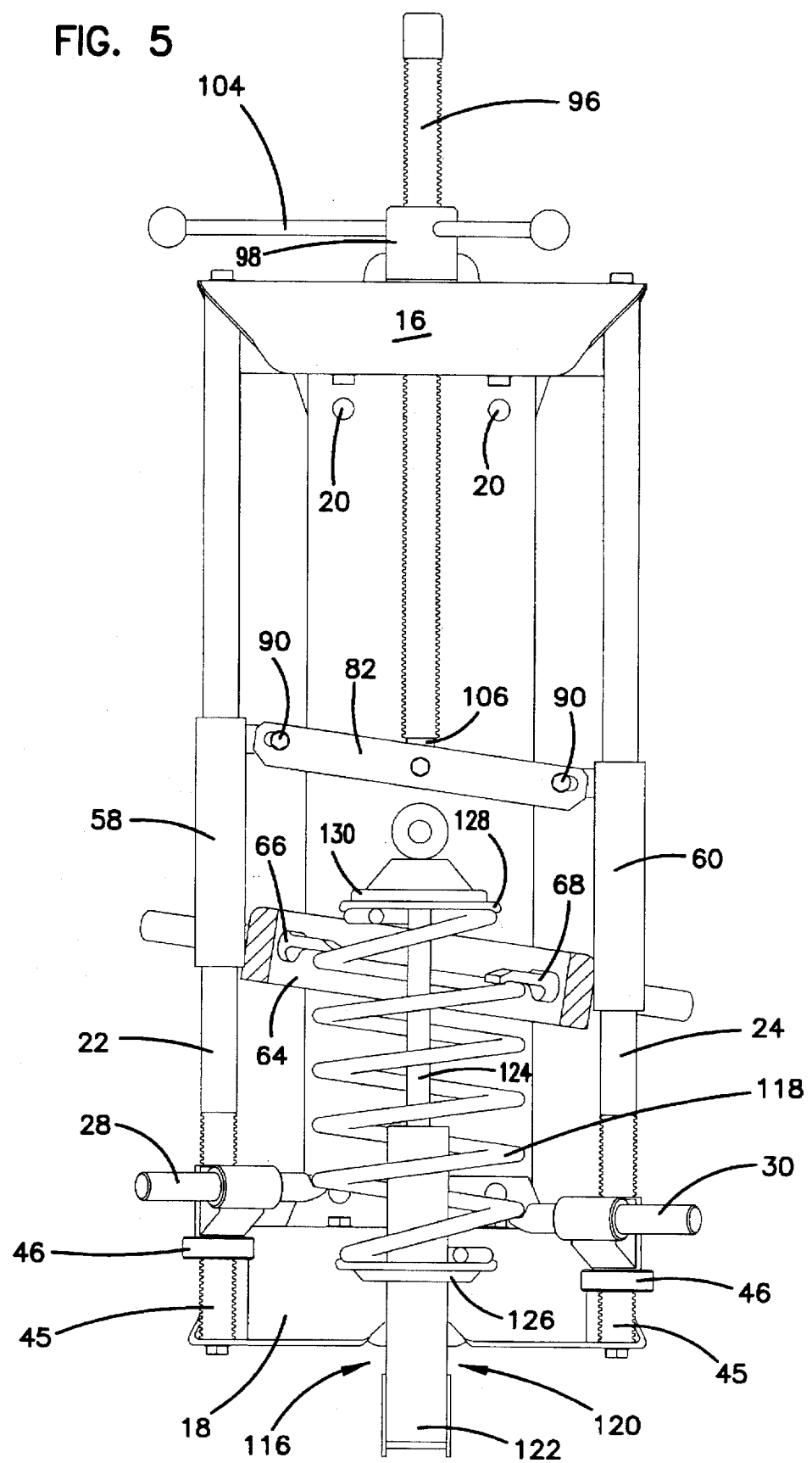
FIG. 5 is a front view similar to FIG. 3 shown being used with one type of strut assembly.

The design of the present invention allows for servicing of at least four different types of strut assemblies, shown in FIGS. 5-8. In FIG. 5, a coil-over-shock type is shown. For that type of assembly, upper hooks 66, 68, 70 are placed directly on the highest possible coil of the spring. The piston rod 124 and upper spring seat 128 on this type of strut assembly is connected by a retaining ring 130.

Figure 6:
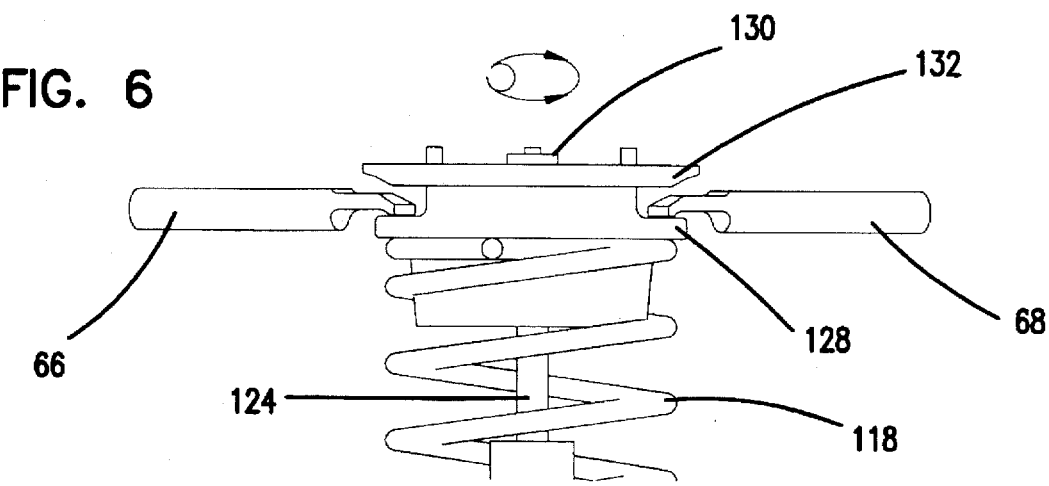
FIGS. 6–8 are partial front elevation views of the embodiment being used with three other types of strut assemblies.

FIG. 6 shows a type of strut which has a rotatable bearing plate 132 and upper spring seat 128. For that type of assembly, upper hooks 66, 68, 70 are placed on the upper spring seat 128.

Figure 7:
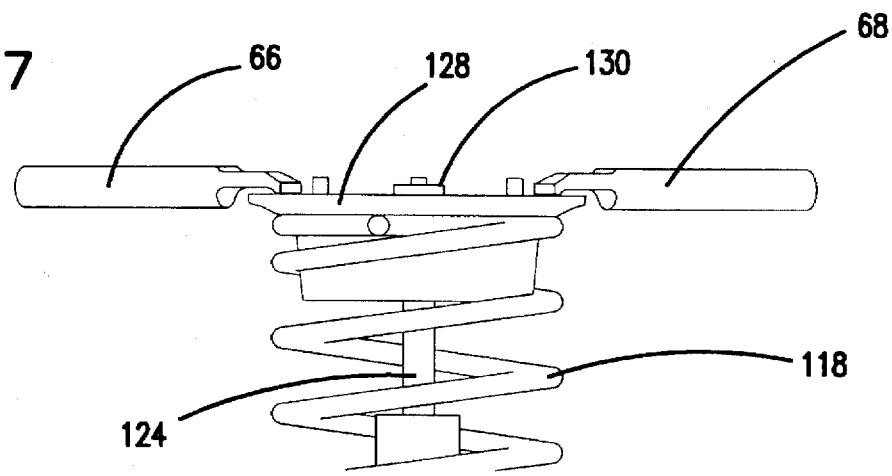

In FIG. 7, a strut assembly is shown which has only an upper spring seat 128. The upper hooks 66, 68, 70 are placed on the upper spring seat 128 for that type of strut assembly.

Figure 8:
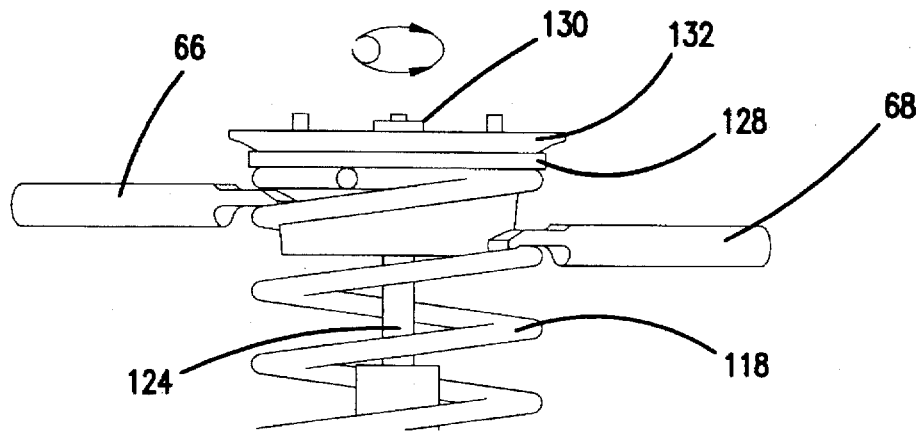

In FIG. 8, the strut has a rotatable bearing plate 132 and an upper spring seat 128 without space between bearing plate 132 and upper spring seat 128. For that type of assembly, the upper hooks 66, 68, 70 are placed on the highest possible coil of the spring 118.

Once the strut assembly is properly positioned in the lower hooks and upper hooks, the operator turns handle 104 to move the second compression section 26 toward the first compression section 48. The handle is turned to compress spring 118 until the bottom coil of spring 118 is just free of the lower spring seat 126.

When the spring 118 is fully compressed, the operator may clip the bottom portion of the spring to the lower spring seat 126. Any conventional clip may be used for this purpose. Next, the operator removes the nut 130 connecting the upper spring seat 128 to the piston rod 124. The clip keeps the shock absorber 120 from falling out of spring 118. If removal of the upper spring seat or spring is desired, the operator then turns the handle 104 in an opposite direction and relieves compression on spring 118. With the compression fully relieved, the operator may remove the spring 118 and replace it or repair the shock absorber as desired.

To replace a spring 118 in compression, the apparatus is used in the sequence opposite to that described above.

It will be apparent to those skilled in the art that various modifications and variations can be made in the present invention and in construction of this without departing from the scope or spirit of the invention. As an example, link structure 80 and pivot structure 72 would not have to be limited to the specific links 82, 84 or pivot members 78, 79. Rather, any structure which would allow head 62 to tilt within two planes would be suitable for the purposes of the invention.

As another example, the first and second compression sections 26, 48, respectively, could be reversed. It is envisioned that the head 62 could be mounted at the lower portion of apparatus 10. An arrangement of hooks similar to lower hooks 28, 30, 32 could be mounted at the upper portion of apparatus 10. Linkage structure 80 and pivot structure 72 would be provided at the lower portion of apparatus 10, and compression would take place from bottom to top. Compression need not be always by urging the second compression second towards the first compression section. Rather, it is envisioned that apparatus 10 could be modified to have the first compression section urged toward the second compression section, or to have both compression sections urged toward each other.

As another example, three points of contact on each of the first and second compression sections are shown in one preferred embodiment. However, it is envisioned by the inventors that the use of more or less than three points of contact on either the first or second compression sections may be used.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. An apparatus for compressing a coil spring, the apparatus comprising:
   (a) a frame;
   (b) a first section connected to said frame for supporting one end of the spring;
      (i) said first section including a rear hook held by a holder; raid rear hook being spring-biased within said holder;
   (c) a second section including,
      (i) a compression head including a ring supporting a plurality of second section hooks for holding a second end of the spring, each of said second section hooks being radially adjustable to and from the center of the ring; and
      (ii) guides connected to said frame and to said head for allowing the head to move toward and away from said first section; and
   (d) urging structure for moving the second section toward the first section.

2. The apparatus of claim 1, wherein each of said second section hooks are rotatably seated with said ring, and wherein said second section hooks engage an upper spring seat of the spring for holding the second end of the spring.

3. The apparatus of claim 1, wherein the second section further includes:

a linkage connected to said guides for allowing the head to tilt along a first axis.

4. The apparatus of claim 3, wherein the second section further includes:

pivot structure connecting the guides to the head to allow the head to tilt along a second axis different from the first axis.

5. The apparatus of claim 1, wherein the first section further includes:

first and second adjustable hooks connected to said frame, said first and second adjustable hooks being radially adjustable to permit ends of the first and second adjustable hooks and said rear hook to meet at a common point.

6. The apparatus of claim 5, wherein said first and second adjustable hooks are vertically adjustable along the frame.

7. An apparatus for use in assembling and disassembling a strut assembly of the type having a shock absorber axially disposed within a coil spring, the apparatus comprising:

(a) a frame;

(b) a first section connected to said frame for supporting one end of the strut assembly;

(c) a second section including,
  (i) a compression head including a circular ring supporting at least first, second, and third hooks for holding a second end of the strut assembly;
  (ii) guides connected to said frame and to said head for allowing the head to move toward and away from said first section;
  (iii) a linkage connected to said guides for allowing the head to tilt along a first axis; and
  (iv) pivot structure connecting the guides to the head to allow the head to tilt along a second axis different from the first axis;
    (A) said pivot structure including first and second pivots mounted on diametrically opposite sides of said circular ring; said circular ring including a first arc extension between said first and second pivots;
    (B) said first and second hooks being positioned along said first arc extension between said first and second pivots and spaced from said first and second pivots; and (d) urging structure for moving the second section toward the first section;

wherein when the second section is moved toward the first section, the coil spring is compressed and the head is allowed to tilt to maintain even contact and load for each of the first, second, and third hooks in the compression head.

8. The apparatus of claim 7, wherein said first, second, and third hooks engage an upper spring seat of the coil spring for holding the second end of the strut assembly.

9. The apparatus of claim 7, wherein said first, second, and third hooks directly engage a coil of the coil spring for holding the second end of the strut assembly.

10. The apparatus of claim 7 wherein:

(a) said first section includes a rear hook held by a holder; said rear hook being spring-biased within said holder.

11. The apparatus of claim 7, wherein:

(a) said first, second, and third hooks each include a first end supported by the circular ring and a free end for engaging the strut assembly; each of said first, second, and third hooks being selectively radially adjustable to meet in a center of the circular ring.

12. The apparatus of claim 11, wherein:

(a) said first, second, and third hooks are rotatably seated within said ring.

13. The apparatus of claim 7, wherein:

(a) said frame includes:
  (i) a top plate;
  (ii) a bottom plate;
  (iii) a back plate connecting said top plate to said bottom plate; and
  (iv) first and second spaced apart parallel bars connecting said top plate to said bottom plate and for supporting said guides.

14. The apparatus of claim 13, wherein:

(a) said guides include:
  (i) a first tube connected to said head; said first tube being slidably fitted over said first bar; and
  (ii) a second tube connected to said head; said second tube being slidably fitted over said second bar.

15. The apparatus of claim 14, wherein:

(a) said linkage includes:
  (i) first and second links;
  (ii) said first link being pivotably connected to said first tube and said second tube; and
  (iii) said second link being pivotably connected to said first tube and said second tube.

16. The apparatus of claim 15, wherein:

(a) said first pivot includes a first fastener attached to said first tube pivotably connecting said first tube to said head; and (b) said second pivot includes a second fastener attached to said second tube pivotably connecting said second tube to said head.

17. The apparatus of claim 7, wherein:

(a) said urging structure includes:
  (i) a screw connected to said linkage; and
  (ii) a hub mounted on said screw and bearing on said frame.

18. The apparatus of claim 7, wherein:

(a) said first section includes:
  (i) fourth, fifth, and sixth hooks; said fourth and fifth hooks being vertically adjustable along the frame.

19. The apparatus of claim 18, further including:

(a) a first means attached to said first, second, and third hooks for protecting the strut assembly and for providing additional friction between said first, second, and third hooks and the strut assembly; and (b) a second means attached to said fourth, fifth, and sixth hooks for protecting the strut assembly and for providing additional friction between said fourth, fifth, and sixth hooks and the strut assembly.

20. The apparatus of claim 7, wherein:

(a) said circular ring includes a second arc extension between said first and second pivots; and (b) said third hook is positioned along said second arc extension between said first and second pivots and spaced from said first and second pivots.

* * * * *